United States Patent
Zhou et al.

(10) Patent No.: US 10,284,768 B2
(45) Date of Patent: May 7, 2019

(54) IMAGE PROCESSING METHOD AND APPARATUS

(71) Applicant: BEIJING ZHIGU RUI TUO TECH CO., LTD., Beijing (CN)

(72) Inventors: Hanning Zhou, Beijing (CN); Jia Liu, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 0 days.

(21) Appl. No.: 15/536,715

(22) PCT Filed: Nov. 20, 2015

(86) PCT No.: PCT/CN2015/095080
§ 371 (c)(1),
(2) Date: Jun. 16, 2017

(87) PCT Pub. No.: WO2016/095651
PCT Pub. Date: Jun. 23, 2016

(65) Prior Publication Data
US 2018/0020148 A1    Jan. 18, 2018

(30) Foreign Application Priority Data

Dec. 18, 2014 (CN) .......................... 2014 1 0798564

(51) Int. Cl.
*G06K 9/00* (2006.01)
*H04N 5/232* (2006.01)
(Continued)

(52) U.S. Cl.
CPC ......... *H04N 5/23212* (2013.01); *G06T 5/003* (2013.01); *G06T 5/10* (2013.01);
(Continued)

(58) Field of Classification Search
None
See application file for complete search history.

(56) References Cited

U.S. PATENT DOCUMENTS

| 8,830,363 | B2  | 9/2014 | Jang |
| 9,076,204 | B2* | 7/2015 | Ogura ............... H04N 5/23212 |

(Continued)

FOREIGN PATENT DOCUMENTS

| CN | 101964866 A | 2/2011 |
| CN | 103262523 A | 8/2013 |

(Continued)

OTHER PUBLICATIONS

Zhou et al., "Coded aperture pairs for depth from defocus and defocus deblurring", Int J Comput Vis (2011) 93: 53-72.*

(Continued)

*Primary Examiner* — Soo Jin Park
(74) *Attorney, Agent, or Firm* — Sheppard Mullin Richter & Hampton LLP

(57) ABSTRACT

Embodiments of the present application provide image processing methods and apparatus. A image processing method disclosed herein comprises: acquiring two images of the same scene shot in the same position with the same aperture pattern and different depth of field parameters; performing frequency-domain conversion on each of the images, to obtain a frequency-domain signal of each image; and obtaining an all-in-focus image of the scene at least according to the frequency-domain signal of each image and the different depth of field parameters.

27 Claims, 6 Drawing Sheets

(51) Int. Cl.
*G06T 5/50* (2006.01)
*G06T 5/00* (2006.01)
*G06T 5/10* (2006.01)
*H04N 5/235* (2006.01)
*H04N 5/225* (2006.01)
*G06T 7/11* (2017.01)

(52) U.S. Cl.
CPC ............ *G06T 5/50* (2013.01); *H04N 5/2258* (2013.01); *H04N 5/2356* (2013.01); *H04N 5/23229* (2013.01); *H04N 5/23232* (2013.01); *G06T 7/11* (2017.01); *G06T 2200/21* (2013.01); *G06T 2207/10016* (2013.01); *G06T 2207/10024* (2013.01); *G06T 2207/10148* (2013.01); *G06T 2207/20021* (2013.01)

(56) References Cited

U.S. PATENT DOCUMENTS

| | | | |
|---|---|---|---|
| 9,407,833 B2* | 8/2016 | Cossairt | G06T 5/003 |
| 2010/0309362 A1* | 12/2010 | Nagata | G01B 11/2513 |
| | | | 348/335 |
| 2011/0019068 A1 | 1/2011 | Chiu | |
| 2013/0335593 A1 | 12/2013 | Jang | |
| 2014/0063203 A1 | 3/2014 | Kawamura | |
| 2014/0146140 A1* | 5/2014 | Shimamoto | G02B 7/08 |
| | | | 348/46 |
| 2014/0293117 A1 | 10/2014 | Murakami | |
| 2015/0332473 A1 | 11/2015 | Cao | |

FOREIGN PATENT DOCUMENTS

| | | |
|---|---|---|
| CN | 103875019 A | 6/2014 |
| CN | 104506771 A | 4/2015 |
| WO | 2014/074138 A1 | 5/2014 |

OTHER PUBLICATIONS

DPReview website 2004, found at https://www.dpreview.com/reviews/canoneos20d.*
Watanabe et al., "Rational filters for passive depth from defocus", International Journal of Computer Vision 27(3), 204-225 (1998).*
International Search Report and Written Opinion for Application No. PCT/CN2015/095080, dated Feb. 25, 2016, 8 pages.
Levin et al., "Image and Depth from a Conventional Camera with a Coded Aperture," ACM Transactions on Graphics, Jul. 2007, vol. 26, No. 3, Article 70, 9 pages.
Krishnan, V., "Image and Depth from a Conventional Camera with a Coded Aperture," ACM Transactions on Graphics, Jul. 2007, Modified slides from author's website http://groups.csail.mit.edu/graphics/CodedAperture/.

* cited by examiner

IMAGE PROCESSING METHOD AND APPARATUS

CROSS-REFERENCE TO RELATED APPLICATIONS

This application is a National Phase Application of International Application No. PCT/CN2015/095080, filed on Nov. 20, 2015, which claims priority to and benefit of Chinese Patent Application No. 201410798564.4, filed on Dec. 18, 2014, and entitled "Image Processing Method and Apparatus", each of which is herein incorporated by reference in its entirety.

TECHNICAL FIELD

The present application generally relates to the field of image technologies, and in particular, to image processing methods and apparatus.

BACKGROUND

With popularity of shooting functions on various kinds of portable devices, users now demand higher requirements for imaging quality. However, due to cost limitations on the portable devices, there is still a big gap in the quality between shooting lenses and sensors on the portable devices and those of professional cameras. In order to make up for the deficiencies of light transmission of the lenses and Signal to Noise Ratios (SNRs) of the sensors and to meet the requirement for lighting under low light conditions, various portable device manufacturers now adopt a greater maximum aperture, but the problem brought about by greater apertures is that depth of field of a focusing plane will be compressed correspondingly, that is, only a shallow scene of a shot picture is clearly focused, but the parts before and after that scene will be vague.

SUMMARY

In view of this, one objective of embodiments of the present application is to provide an image processing solution.

To achieve the above objective, according to a first aspect, the embodiments of the present application provide an image processing method, comprising:

acquiring two images of the same scene shot in the same position with the same aperture pattern and different depth of field parameters;

performing frequency-domain conversion on each of the images, to obtain a frequency-domain signal of each image; and obtaining an all-in-focus image of the scene according to the frequency-domain signal of each image and the different depth of field parameters.

To achieve the above objective, according to a second aspect, the embodiments of the present application provide an image processing apparatus, comprising:

an image acquisition module, configured to acquire two images of the same scene shot in the same position with the same aperture pattern and different depth of field parameters;

a frequency-domain conversion module, configured to perform frequency-domain conversion on each of the images, to obtain a frequency-domain signal of each image; and a first processing module, configured to obtain an all-in-focus image of the scene according to the frequency-domain signal of each image and the different depth of field parameters.

The above multiple technical solutions may have the following beneficial effects:

The embodiments of the present application, by acquiring two images of the same scene shot in the same position with the same aperture pattern and different depth of field parameters, performing frequency-domain conversion on each of the images, to obtain a frequency-domain signal of each image, and obtaining an all-in-focus image of the scene according to the frequency-domain signal of each image and the different depth of field parameters, provide an image processing solution, and can obtain the all-in-focus image of one scene based on two images of the scene with different depth of field parameters, which is more convenient.

DETAILED DESCRIPTION

Specific implementations of the present application are further described below in detail with reference to the accompanying drawings and embodiments. The following embodiments are intended to describe the present application, but are not intended to limit the scope of the present application.

Figure 1:
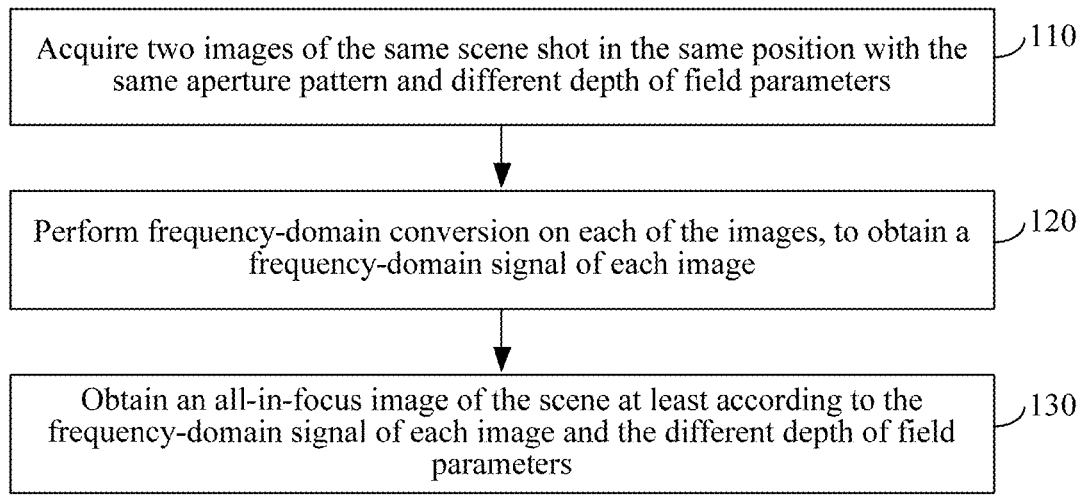
FIG. 1 is a schematic flowchart of an embodiment of an image processing method according to the present application.

FIG. 1 is a schematic flowchart of an embodiment of an image processing method according to the present application. As shown in FIG. 1, this embodiment comprises:

110. Acquire two images of the same scene shot in the same position with the same aperture pattern and different depth of field parameters.

For example, an image processing apparatus in Embodiment 1 or Embodiment 2 of the present application performs 110-130. Optionally, the image processing apparatus is installed in a user terminal in a form of software and/or hardware. Optionally, the user terminal is a camera, or any user terminal comprising an image shooting component, for example, a smartphone with a shooting function.

In this embodiment, the aperture pattern may be any pattern, commonly a polygon, such as a hexagon.

In this embodiment, the depth of field parameters refer to parameters that affect the size and/or position of depth of field, and the depth of field parameters comprise at least one of the following: aperture F values, focusing distances.

The aperture F value refers to aperture F value when the image shooting apparatus shoots the image. In a case where the aperture pattern is fixed, the aperture F value decides aperture size. Generally, for an image shooting apparatus, its aperture pattern may be fixed, but its aperture size can be adjusted under some circumstances. Specifically, the aperture size may be represented by the reciprocal of the square of aperture F value, that is, $1/F^2$, and often used F values include: 1.0, 1.4, 2.0, 2.8, 4.0, 5.6, 8.0, 11 and so on.

Figure 2:
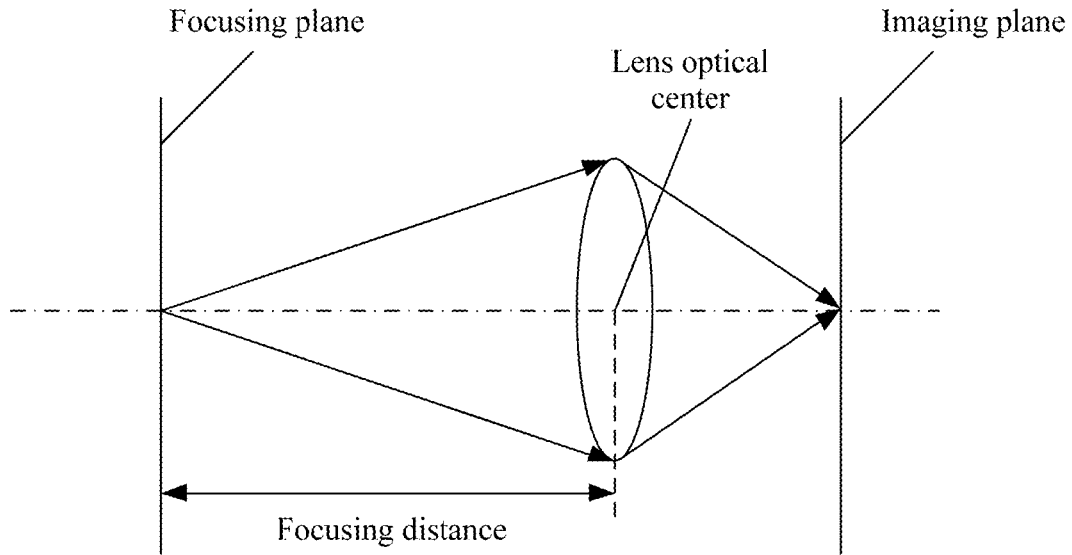
FIG. 2 is a schematic diagram of a focusing distance according to the present application.

The focusing distance refers to the distance between the focusing plane and the lens optical center of the image shooting apparatus when the image shooting apparatus shoots the image. FIG. 2 is a schematic diagram of a focusing distance according to the present application. Specifically, the focusing distance is affected by a lens focal length and an image distance (that is, a distance between an imaging plane and a lens optical center). In a scene where the lens focal length is constant, generally, the focusing distance may be adjusted by adjusting the image distance; in a scene where the lens focal length is variable, the focusing distance can be adjusted by adjusting the image distance and/or the lens focal length.

In this embodiment, the different depth of field parameters may be any one of the following: aperture F values are the same but focusing distances are different, the focusing distances are the same but the aperture F values are different, and both the aperture F values and the focusing distances are different.

In this embodiment, aperture F value and focusing distance of each image may be obtained from header files of the image.

120. Perform frequency-domain conversion on each of the images, to obtain a frequency-domain signal of each image.

In this embodiment, each image can be represented by at least one space-domain signal of the image. The space-domain signals may include, but not limited to, any one of the following: a grey scale signal, a red (R) signal, a green (G) signal, and a blue (B) signal.

Optionally, acquiring two images of the same scene shot in the same position with the same aperture pattern and different depth of field parameters may comprise: acquiring a space-domain signal of each image.

Performing frequency-domain conversion on each of the images, to obtain a frequency-domain signal of each image may comprise: performing frequency-domain conversion on the space-domain signal of each image, to obtain a frequency-domain signal of each image.

For example, the two images include an image A and an image B, in 110, an R signal of the image A and an R signal of the image B are acquired, and in 120, frequency-domain conversion is performed respectively on the R signal of the image A and the R signal of the image B, to obtain a frequency-domain signal of the image A and a frequency-domain signal of the image B.

Specifically, as the images are generally two-dimensional, space-domain signals of the images are also two-dimensional, that is, independent variable spaces of the space-domain signals of the images are two-dimensional spaces.

In this embodiment, the frequency-domain conversion may be performed in different manners, for example, Fourier Transform (FT), Wavelet Transform (WT) and so on.

130. Obtain an all-in-focus image of the scene according to the frequency-domain signal of each image and the different depth of field parameters.

In this embodiment, the obtaining an all-in-focus image of the scene according to the frequency-domain signal of each image and the different depth of field parameters comprises: obtaining a space-domain signal of the all-in-focus image of the scene according to the frequency-domain signal of each image and the different depth of field parameters.

For example, the two images include an image A and an image B, in 110, an R signal of the image A and an R signal of the image B are acquired, in 120, frequency-domain conversion is performed respectively on the R signal of the image A and the R signal of the image B, to obtain a frequency-domain signal of the image A and a frequency-domain signal of the image B, and in 130, an R signal of the all-in-focus image is obtained according to the frequency-domain signal of the image A, the frequency-domain signal of the image B and the different depth of field parameters.

For the same scene, when images of the scene are shot in the same position with the same aperture pattern and different depth of field parameters, a space-domain signal of each image shot is equivalent to a result of convolution of a corresponding space-domain signal of the all-in-focus image of the scene and a Point Spread Function (PSF) (also called PSF of the image) of an optical system when the image shooting apparatus shoots the image, for example, an R signal of an image shot is equivalent to a result of convolution of an R signal of an all-in-focus image of the scene and a PSF of the image, while the PSF of the image is related to the aperture pattern of the image shooting apparatus and the depth of field parameters when the image is shot. Specifically, PSF patterns of images obtained by using image shooting apparatuses with the same aperture pattern to shoot the same scene in the same position are generally the same, and different depth of field parameters during shooting decide scaling of PSFs with the same pattern in the independent variable space. For example, if focusing distances of two images obtained by using image shooting apparatuses with the same aperture pattern to shoot the same scene in the same position are identical but a ratio of aperture sizes is 2, that is, a reciprocal of a ratio of squares of the aperture F values is 2, the PSF of the image with a greater aperture is equivalent to a result of enlarging the PSF of the image with a smaller aperture in the independent variable space by 4 times; if aperture sizes of the two images obtained by using image shooting apparatuses with the same aperture pattern to shoot the same scene in the same position are identical but an absolute value of a ratio of the differences between focusing distances and depths of the scene is 2, the PSF of the image with a greater absolute value of the difference is equivalent to a result of enlarging the PSF of the image with a smaller absolute value of said difference in the independent variable space by 4 times. Further, as convolution of space domain is equivalent to multiplication of frequency domain, a frequency-domain signal of each image shot is equivalent to a product of a corresponding frequency-domain signal of the all-in-focus image of the scene and an Optical Transfer Function (OTF) (also called OTF of the image) of an optical system when the image shooting apparatus shoots the image, for example, a frequency-domain signal of an R signal of an image shot is equivalent to a product of a frequency-domain signal of an R signal of the all-in-focus image of the scene and an OTF of the image, wherein OTF is a frequency-domain representation of PSF. Specifically, patterns of OTFs of images obtained by using image shooting apparatuses with the same aperture pattern to shoot the same scene in the same position are generally the same, while different depth of field parameters during shooting decide scaling of the OTFs with the same pattern in a frequency space, and the scaling of the OTFs and the scaling of the PSFs are reversed. For example, if focusing distances of two images obtained by using image shooting apparatuses with the same aperture pattern to shoot the same scene in the same position are the same but a ratio of aperture sizes is 2, the OTF of the image with a smaller aperture is equivalent to a result of enlarging the OTF of the image with a greater aperture in a frequency space by 4 times; if aperture sizes of the two images obtained by using image shooting apparatuses with the same aperture pattern to shoot the same scene in the same position are identical but an absolute value of a ratio of differences between focusing distances and depths of the scene is 2, the OTF of the image with a smaller absolute value of the difference is equivalent to a result of enlarging the OTF of the image with a greater absolute value of the difference in an independent variable space by 4 times.

Specifically, a depth of the scene is a distance between the scene and a lens optical center of the image shooting apparatus, and optionally, the depth of the scene is an average value of a maximum distance and a minimum distance between the objects of the scene from the lens optical center of the image shooting apparatus. As the two images are shot for the same scene in the same position, it can be considered that depths of the scene in the two images are the same.

Accordingly, if, in 110, corresponding space-domain signals K1 and K2 of two images are acquired, in 120, frequency-domain conversion is performed on K1 and K2, to obtain frequency-domain signals W1 and W2 of the two images, suppose that OTFs of the two images are F1 and F2 and a corresponding frequency-domain signal of the all-in-focus image of the scene is I, then W1=I*F1, W2=I*F2, and F1=a*F2 are met, wherein a is related to depth of field parameters of the two images. Correspondingly, if W1, W2 and a are known, I, F1 and F2 can be obtained, and further, a space-domain signal of the all-in-focus image of the scene can be obtained according to I.

This embodiment, by acquiring two images of the same scene shot in the same position with the same aperture pattern and different depth of field parameters, performing frequency-domain conversion on each of the images, to obtain a frequency-domain signal of each image, and obtaining an all-in-focus image of the scene according to the frequency-domain signal of each image and the different depth of field parameters, provides an image processing solution, and can obtain the all-in-focus image of a scene based on two images of the scene with different depth of field parameters, which is more convenient.

The method of this embodiment is further described below through some alternative implementations.

Figure 3:
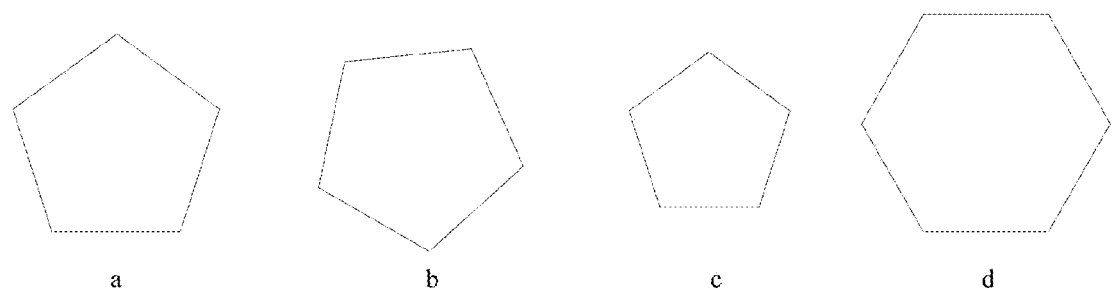
FIG. 3 is a schematic diagram of several possible aperture forms according to one embodiment of the present application.

In this embodiment, although aperture patterns of the two images are the same, aperture sizes may be different, while in a scene where the aperture sizes are different, aperture angles may also vary, thereby resulting in that patterns of PSFs and OTFs are different. The aperture angles are generally changed with rotation of apertures. FIG. 3 is a schematic diagram of several possible aperture forms according to one embodiment of the present application. As shown in FIG. 3, aperture patterns of a, b and c are the same and are all pentagons, aperture sizes of a and b are the same but aperture angles are different, aperture sizes of a and c are different but aperture angles are the same, while an aperture pattern of d is a hexagon, which is different from the aperture patterns of a, b and c.

In order to avoid that different aperture angles lead to different PSF patterns and OTF patterns of the images, optionally, in 110, independent variable spaces of space-domain signals of the images acquired are polar coordinates spaces, or, in 110, independent variable spaces of space-domain signals of the images acquired are other coordinates spaces, for example, rectangular coordinates spaces, and correspondingly, before 120, the independent variable spaces of the space-domain signals of the images are converted to polar coordinates spaces. Further, in 130, an independent variable space of a space-domain signal of the all-in-focus image directly obtained according to the frequency-domain signal of each image and the different depth of field parameters is a polar coordinates space, and optionally, in 130, the independent variable space of the space-domain signal of the all-in-focus image may further be converted to another coordinates space, for example, a rectangular coordinates space.

In this embodiment, 120 has many manners of implementation.

For objects with similar depths, PSFs of the same optical system vary slightly, and in one optional implementation, performing frequency-domain conversion on each of the images to obtain a frequency-domain signal of each image comprises:

in response to that a maximum depth difference of the scene does not exceed a first depth difference threshold, performing frequency-domain conversion on each of the images, to obtain a frequency-domain signal of each image.

In this embodiment, the maximum depth difference of the scene refers to a maximum difference between depths of the objects of the scene. Specifically, the depth of each object refers to distance between the object and a lens optical center of the image shooting apparatus when the scene is shot.

The first depth difference threshold may be a preset value, for example, 1 meter. Optionally, the first depth difference threshold may be related to parameters of the image shooting apparatus, for example, a focal length.

For objects whose depths vary greatly, PSFs of the same optical system may vary greatly, and in order to obtain a more vivid all-in-focus image, in another optional implementation, performing frequency-domain conversion on each of the images, to obtain a frequency-domain signal of each image comprises:

in response to that a maximum depth difference of the scene exceeds a second depth difference threshold, dividing each image into at least two regions in the same way, a maximum depth difference of each region not exceeding the second depth difference threshold; and performing frequency-domain conversion on at least one pair of space-domain signals of at least one corresponding pair of regions in each image, to obtain at least one pair of frequency-domain signals of the at least one pair of regions.

In this embodiment, the maximum depth difference of the scene refers to a maximum difference between depths of the objects of the scene. Specifically, the depth of each object refers to the distance between the object and the lens optical center of the image shooting apparatus when the scene is shot.

The second depth difference threshold may be a preset value, for example, 1 meter. Optionally, the second depth difference threshold may be related to parameters of the image shooting apparatus, for example, a focal length. It should be noted that, the second depth difference threshold and the first depth difference threshold may be the same or different.

As the images are images of the scene, the objects in the scene are distributed identically in the images, and further, as the images are divided in the same manner, objects included in each corresponding pair of regions in the images are also the same, and depths of each pair of regions are also the same. In this embodiment, a depth of any region can be obtained through depths of objects in the region, for example, a depth of a region may be an average value of a maximum depth and a minimum depth of the objects in the region.

In this embodiment, 130 has many manners of implementation.

In one optional implementation, the two images include: a first image and a second image; a product of a ratio of the square of an aperture F value of the second image to the square of an aperture F value of the first image and an absolute value of a ratio of a difference between a depth of the scene in the first image and a focusing distance of the first image to a difference between a depth of the scene in the second image and a focusing distance of the second image is a first value greater than 1; and obtaining an all-in-focus image of the scene at least according to the frequency-domain signal of each image and the different depth of field parameters comprises:

taking a part of a first spectrum region, which has the lowest frequency and an area of a second value, in a first frequency-domain signal of the first image as a part of the first spectrum region in a first optical transfer function OTF of the first image;

enlarge the part of the first spectrum region in the first OTF in a frequency space by a factor of the square of the first value, to obtain a part of a second spectrum region in a second OTF of the second image, an area of the second spectrum region being equal to a product of an area of the first spectrum region and the square of the first value;

performing local inversion on a second frequency-domain signal of the second image based on the part of the second spectrum region in the second OTF, to obtain a part of the second spectrum region in a third frequency-domain signal of the all-in-focus image;

performing local inversion on the first frequency-domain signal based on the part of the second spectrum region in the third frequency-domain signal, to obtain a part of the second spectrum region in the first OTF;

successively iterating the enlargement and the local inversion based on the part of the second spectrum region in the first OTF, to obtain the third frequency-domain signal; and performing space-domain conversion on the third frequency-domain signal, to obtain a space-domain signal of the all-in-focus image.

Specifically, the obtained space-domain signal of the all-in-focus image corresponds to the space-domain signal of each image on which frequency-domain conversion is performed in 120. For example, if the first frequency-domain signal and the second frequency-domain signal are obtained by performing frequency-domain conversion on R signals of the first image and the second image, the obtained space-domain signal of the all-in-focus image is an R signal of the all-in-focus image.

In this embodiment, a part of a spectrum region in a signal or a function refers to a part in the signal or the function which belongs to the spectrum region. For example, the part of the first spectrum region in the first frequency-domain signal refers to a part in the first frequency-domain signal which belongs to the first spectrum region, and the part of the first OTF refers to a part in the first OTF which belongs to the first spectrum region.

Specifically, a ratio of the square of an aperture F value of the second image to the square of an aperture F value of the first image is a1, an absolute value of a ratio of a difference between a depth of the scene in the first image and a focusing distance of the first image to a difference between a depth of the scene in the second image and a focusing distance of the second image is a2, and the first value is m=a1*a2. Wherein a1 is optionally greater than 1, less than 1 or equal to 1; a2 is optionally greater than 1, less than 1 or equal to 1. It should be noted that, a1=1 indicates that the aperture F value of the second image is equal to the aperture F value of the first image, that is, an aperture size of the second image is equal to an aperture size of the first image, as m>1, if a1=1, a2 is greater than 1, that is, an absolute value of a difference between a depth of the scene in the first image and a focusing distance of the first image is greater than an absolute value of a difference between a depth of the scene in the second image and a focusing distance of the second image, that is, a distance between the scene and a focusing plane in the first image is greater than a distance between the scene and a focusing plane in the second image; a2=1 indicates that the absolute value of the difference between the depth of the scene in the first image and the focusing distance of the first image is equal to the absolute value of the difference between the depth of the scene in the second image and the focusing distance of the second image, that is, the focusing distance of the first image is equal to the focusing distance of the second image, as m>1, if a2=1, a1 is greater than 1, that is, the aperture F value of the second image is greater than the aperture F value of the first image, i.e., the aperture size of the second image is less than the aperture size of the first image.

As the first value m is greater than 1, the first PSF of the first image is equivalent to a result of enlarging the second PSF of the second image in an independent variable space by factor of $m^2$, and the first OTF of the first image is equivalent to a result of reducing the second OTF of the second image in a frequency space to $1/m^2$.

It should be noted that, in this implementation, a product of the reciprocal of a ratio of squares of the aperture F values of the two images and a ratio of distances between the scene and focusing planes of the two images is not equal to 1.

The second value may be a preset value. As the scene generally has a part where colors are relatively even, correspondingly, a lowest-frequency spectrum region of the first frequency-domain signal has a part where an amplitude is a constant, and correspondingly, the second value can be set with an aim to ensure that an amplitude of a part of the first spectrum region, which has the lowest frequency and has an area of the second value, in the frequency-domain signal is a constant. Further, the step of taking a part of a first spectrum region, which has the lowest frequency and an area of a second value, in a first frequency-domain signal of the first image as a part of the first spectrum region in a first OTF of the first image is equivalent to considering an amplitude of a part of the first spectrum region, which has the lowest frequency and an area of the second value, in the third frequency-domain signal as 1, which may affect amplitude of the third frequency-domain signal finally obtained, but will not affect wave forms of the third frequency-domain signal. As a result, compared with a space-domain signal that should be obtained theoretically, wave forms of a space-domain signal of the all-in-focus image obtained are the same but amplitude is reduced or enlarged on the whole.

This can be solved by reducing or enlarging an amplitude of a space-domain signal of the all-in-focus image according to a proportional relationship between a maximum amplitude of the obtained space-domain signal of the all-in-focus image and a maximum amplitude of a corresponding space-domain signal of any of the above images.

Optionally, independent variable spaces of space-domain signals of regions on which frequency-domain conversion is performed in 120 are rectangular coordinates spaces. Further, the first spectrum region may be a square region.

Optionally, independent variable spaces of space-domain signals of regions on which frequency-domain conversion is performed in 120 are polar coordinates spaces. Further, the first spectrum region may be a circular region.

Optionally, enlarging, in a frequency space, by a factor of the square of the first value refers to enlarging in two dimensions in the frequency space by a factor of the first value. Correspondingly, if the first spectrum region is a square region, the second spectrum region is also a square region, and a side length of the second spectrum region is equal to a side length of the first spectrum region multiplied by the first value; if the first spectrum region is a circular region, the second spectrum region is also a circular region, and a radius of the second spectrum region is equal to a radius of the first spectrum region multiplied by the first value.

In this implementation, in order to further obtain at least one other space-domain signal of the all-in-focus image, for example, after the R signal of the all-in-focus image is obtained, a G signal and a B signal of the all-in-focus image are obtained, and optionally, successively iterating the enlargement and the local inversion based on the part of the second spectrum region in the first OTF, to obtain the third frequency-domain signal comprises:

successively iterating the enlargement and the local inversion based on the part of the second spectrum region in the first OTF, to obtain the third frequency-domain signal and the first OTF;

the method further comprises: acquiring at least one other space-domain signal of the first image; performing frequency-domain conversion on the at least one other space-domain signal of the first image, to obtain at least one other frequency-domain signal of the first image; performing inversion on the at least one other frequency-domain signal of the first image, to obtain at least one fourth frequency-domain signal of the all-in-focus image; and performing space-domain conversion on the at least one fourth frequency-domain signal of the all-in-focus image, to obtain at least one other space-domain signal of the all-in-focus image.

It should be noted that, in the step, how the at least one other space-domain signal of the all-in-focus image is obtained is described by taking the first image and the first OTF as an example, and those skilled in the art would understand that, the same purpose may also be achieved by replacing the first image with the second image and replacing the first OTF with the second OTF, to obtain the at least one other space-domain signal of the all-in-focus image.

In another optional implementation, corresponding to 120, in which the images are divided into at least two regions respectively in the same manner, to obtain at least one pair of frequency-domain signals of at least one corresponding pair of regions in the images, in 130, the at least one pair of frequency-domain signals of the at least one pair of regions are processed by referring to the above implementation.

Optionally, the two images include: a third image and a fourth image, and the at least one corresponding pair of regions in each image comprise: a first region in the third image and a second region in the fourth image corresponding to the first region;

a product of a ratio of the square of an aperture F of the fourth image to the square of an aperture F value of the third image and an absolute value of a ratio of a difference between a depth of the scene in the third image and a focusing distance of the third image to a difference between a depth of the scene in the fourth image and a focusing distance of the fourth image is a third value greater than 1; and obtaining an all-in-focus image of the scene at least according to the frequency-domain signal of each image and the different depth of field parameters comprises:

obtaining a space-domain signal of a first sub-image of a third region in the scene corresponding to the first region and a third OTF of the first region at least according to a fifth frequency-domain signal of the first region, a sixth frequency-domain signal of the second region and the third value;

obtaining at least one space-domain signal of at least one second sub-image of at least one fifth region in the scene corresponding to at least one fourth region at least corresponding to a focusing distance of the first image, a depth of the first region, the third OTF, at least one depth and at least one space-domain signal of the at least one fourth region in the first image other than the first region; and obtaining a space-domain signal of the all-in-focus image according to the space-domain signal of the first sub-image of the third region and the at least one space-domain signal of the at least one second sub-image of the at least one fifth region.

In this embodiment, a depth of any region can be obtained through depths of objects in the region, for example, a depth of a region may be an average value of a maximum depth and a minimum depth of the objects in the region.

Specifically, a ratio of the square of an aperture F value of the fourth image to the square of an aperture F value of the third image is b1, an absolute value of a ratio of a difference between a depth of the scene in the third image and a focusing distance of the third image to a difference between a depth of the scene in the fourth image and a focusing distance of the fourth image is b2, and the third value is n=b1\*b2. Wherein b1 is optionally greater than 1, less than 1 or equal to 1; b2 is optionally greater than 1, less than 1 or equal to 1. It should be noted that, b1=1 indicates that the aperture F value of the fourth image is equal to the aperture F value of the third image, that is, an aperture size of the fourth image is equal to an aperture size of the third image, as n>1, if b1=1, b2 is greater than 1, that is, an absolute value of a difference between a depth of the scene in the third image and a focusing distance of the third image is greater than an absolute value of a difference between a depth of the scene in the fourth image and a focusing distance of the fourth image, that is, a distance between the scene and a focusing plane in the third image is greater than a distance between the scene and a focusing plane in the fourth image; b2=1 indicates that the absolute value of the difference between the depth of the scene in the third image and the focusing distance of the third image is equal to the absolute value of the difference between the depth of the scene in the fourth image and the focusing distance of the fourth image, that is, the focusing distance of the third image is equal to the focusing distance of the fourth image, as n>1, if b2=1, b1 is greater than 1, that is, the aperture F value of the fourth image is greater than the aperture F value of the third image, i.e., the aperture size of the fourth image is less than the aperture size of the third image.

As the third value n is greater than 1, the third PSF of the first region is equivalent to a result of enlarging the fourth PSF of the second region in an independent variable space by a factor of $n^2$, and the third OTF of the first region is equivalent to a result of reducing the fourth OTF of the second region in a frequency space to $1/n^2$.

It should be noted that, in the implementation, a product of the reciprocal of a ratio of squares of the aperture F values of the two images and a ratio of distances between the scene in the two images and focusing planes is not equal to 1.

Specifically, reference can be optionally made to the manner of obtaining a space-domain signal of the all-in-focus image of the scene and the first OTF in the previous implementation for the implementation of obtaining a space-domain signal of a first sub-image of a third region in the scene corresponding to the first region and a third OTF of the first region at least according to a fifth frequency-domain signal of the first region, a sixth frequency-domain signal of the second region and the third value. Optionally, obtaining a space-domain signal of a first sub-image of a third region in the scene corresponding to the first region and a third OTF of the first region at least according to a fifth frequency-domain signal of the first region, a sixth frequency-domain signal of the second region and the third value comprises:

taking a part of a third spectrum region, which has the lowest frequency and an area of a fourth value, in the fifth frequency-domain signal as a part of the third spectrum region in a third OTF of the first region;

enlarging the part of the third spectrum region in the third OTF in a frequency space by a factor of the third value, to obtain a part of a fourth spectrum region in a fourth OTF of the second region, an area of the fourth spectrum region being equal to a product of an area of the third spectrum region and the square of the third value;

performing local inversion on the sixth frequency-domain signal based on the part of the fourth spectrum region in the fourth OTF, to obtain a part of the fourth spectrum region in a seventh frequency-domain signal of the first sub-image;

performing local inversion on the fifth frequency-domain signal based on the part of the fourth spectrum region in the seventh frequency-domain signal, to obtain a part of the fourth spectrum region in the third OTF;

successively iterating the enlargement and the local inversion based on the part of the fourth spectrum region in the third OTF, to obtain the seventh frequency-domain signal and the third OTF; and performing space-domain conversion on the seventh frequency-domain signal, to obtain a space-domain signal of the first sub-image.

The fourth value may be a preset value. As the scene generally has a part where colors are relatively even, correspondingly, a lowest-frequency spectrum region of the fifth frequency-domain signal has a part where an amplitude is a constant, and correspondingly, the fourth value can be set with an aim to ensure that an amplitude of a part of the third spectrum region, which has the lowest frequency and has an area of the fourth value, in the fifth frequency-domain signal is a constant. The step of taking a part of a third spectrum region, which has the lowest frequency and an area of a fourth value, in the fifth frequency-domain signal as a part of the third spectrum region in a third OTF of the first region is equivalent to considering an amplitude of a part of the third spectrum region, which has the lowest frequency and an area of the fourth value, in the seventh frequency-domain signal as 1, which may affect amplitude of the seventh frequency-domain signal finally obtained, but will not affect wave forms of the seventh frequency-domain signal. As a result, compared with a space-domain signal that should be obtained theoretically, wave forms of a space-domain signal of the first sub-image obtained are the same but amplitude is reduced or enlarged on the whole. This can be solved by reducing or enlarging an amplitude of the space-domain signal of the first sub-image according to a proportional relationship between a maximum amplitude of the obtained space-domain signal of the first sub-image and a maximum amplitude of a corresponding space-domain signal of the first region.

Optionally, independent variable spaces of space-domain signals of regions on which frequency-domain conversion is performed in 120 are rectangular coordinates spaces, and further optionally, the third spectrum region may be a square region.

Optionally, independent variable spaces of space-domain signals of regions on which frequency-domain conversion is performed in 120 are polar coordinates spaces, and further optionally, the third spectrum region may be a circular region.

Optionally, enlarging, in a frequency space, by a factor of the square of the third value refers to enlarging in two dimensions in the frequency space by a factor of the third value. Correspondingly, if the third spectrum region is a square region, the fourth spectrum region is also a square region, and a side length of the fourth spectrum region is equal to a side length of the third spectrum region multiplied by the third value; if the third spectrum region is a circular region, the fourth spectrum region is also a circular region, and a radius of the fourth spectrum region is equal to a radius of the third spectrum region multiplied by the third value.

As, in the same optical system, differences of OTFs of different regions in the same image are related to differences between depths of the corresponding regions and a focusing distance of the image, optionally, obtaining at least one space-domain signal of at least one second sub-image of at least one fifth region in the scene corresponding to at least one fourth region at least corresponding to a focusing distance of the first image, a depth of the first region, the third OTF, at least one depth and at least one space-spectrum signal of the at least one fourth region in the first image other than the first region comprises:

obtaining at least one fifth OTF of the at least one fourth region at least corresponding to a focusing distance of the first image, a depth of the first region, the third OTF, at least one depth and at least one space-spectrum signal of the at least one fourth region;

performing inversion on a frequency-domain signal of each fourth region according to the fifth OTF of each fourth region, to obtain a frequency-domain signal of each second sub-image; and performing space-domain conversion on the frequency-domain signal of each second sub-image, to obtain a space-domain signal of each second sub-image.

The frequency-domain signal of each fourth region can be obtained in a manner of performing frequency-domain conversion on a space-domain signal of each fourth region.

For example, the focusing distance of the first image is L, the depth of the first region is d1, the at least one fourth region includes a region A and a region B, depths of the region A and the region B are da and db respectively, if $|da-L/d1-L|>1$, a PSF of the region A is equivalent to a result of enlarging the third PSF of the first region in an independent variable space by a factor of $|da-L/d1-L|^2$, and an OTF of the region A is equivalent to a result of reducing the third OTF of the first region to $|d1-L/da-L|^2$ in a frequency space, if $|db-L/d1-L|<1$, a PSF of the region B is equivalent to a result of reducing the third PSF of the first region to $|d1-L/db-L|^2$ in the independent variable space, and an OTF of the region B is equivalent to a result of enlarging the third OTF of the first region in the frequency space by a factor of $|db-L/d1-L|^2$.

Specifically, the first region and the at least one fourth region cover all regions of the first image.

Optionally, the obtaining a space-domain signal of the all-in-focus image according to the space-domain signal of the first sub-image of the third region and the at least one space-domain signal of the at least one second sub-image of the at least one fifth region comprises:

synthesizing the space-domain signal of the first sub-image and the at least one space-domain signal of the at least one second sub-image of the at least one fifth region into a space-domain signal of the all-in-focus image according to distribution of respective corresponding first regions and at least one fourth region in the first image.

It should be noted that, in this implementation, how a space-domain signal of the all-in-focus image is obtained is described by taking the third OTF of the first region as an example, and those skilled in the art would understand that, the same purpose may also be achieved by replacing the first region with the second region and replacing the third OTF of the first region with the fourth OTF of the second region, to obtain a space-domain signal of the all-in-focus image.

In this implementation, in order to further obtain at least one other space-domain signal of the all-in-focus image, for example, a G signal and a B signal of the all-in-focus image are obtained after an R signal of the all-in-focus image is obtained, optionally, this embodiment further comprises:

acquiring at least one other space-domain signal of the first region; performing frequency-domain conversion on the at least one other space-domain signal of the first region, to obtain at least one other frequency-domain signal of the first region; and obtaining at least one other space-domain signal of the first sub-image according to the third OTF and the at least one other frequency-domain signal of the first region;

acquiring at least one other space-domain signal of each fourth region; performing frequency-domain conversion on the at least one other space-domain signal of each fourth region, to obtain at least one other frequency-domain signal of each fourth region; and obtaining at least one other space-domain signal of the second sub-image according to the third OTF and the at least one other frequency-domain signal of each fourth region; and obtaining at least one other space-domain signal of the all-in-focus image according to the at least one other space-domain signal of the first sub-image and the at least one other space-domain signal of the second sub-image.

It should be noted that, in the steps, how at least one other space-domain signal of the all-in-focus image is obtained is described by taking the first region and the third OTF as an example, and those skilled in the art would understand that, the same purpose may also be achieved by replacing the first region with the second region and replacing the third OTF with the fourth OTF, to obtain the at least one other space-domain signal of the all-in-focus image.

In this embodiment, 110 has many manners of implementation.

In one optional implementation, the acquiring two images of the same scene shot in the same position with the same aperture pattern and different depth of field parameters comprises:

acquiring, from an image shooting apparatus, two images of the same scene shot by an image shooting apparatus in the same position with different depth of field parameters.

Optionally, the image shooting apparatus may be designed to automatically shoot two images of the same scene with different depth of field parameters after a user presses the "shoot" button.

In another optional implementation, the acquiring two images of the same scene shot in the same position with the same aperture pattern and different depth of field parameters comprises:

acquiring, respectively from two image shooting apparatuses with the same aperture pattern, two images of the same scene shot by the two image shooting apparatuses in the same position with different depth of field parameters.

Figure 4A:
FIG. 4A and FIG. 4B are a schematic diagram of two images of the same scene shot in the same position with the same aperture pattern and different aperture sizes.
Figure 4B:
Figure 4C:
FIG. 4C is a schematic diagram of an all-in-focus image obtained with the method in an embodiment on the basis of FIG. 4A and FIG. 4B.

FIG. 4A and FIG. 4B are a schematic diagram of two images of the same scene shot in the same position with the same aperture pattern and different aperture sizes. FIG. 4C is a schematic diagram of an all-in-focus image obtained with the method in this embodiment on the basis of FIG. 4A and FIG. 4B.

Figure 5:
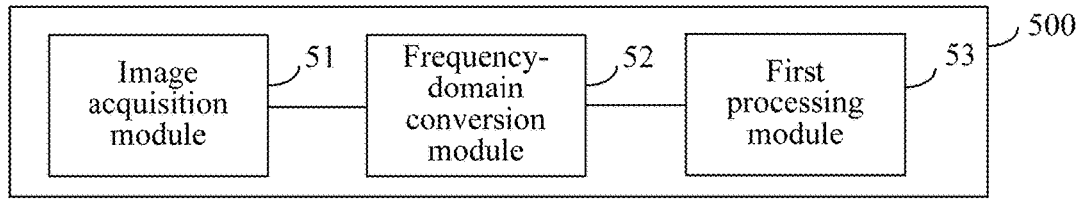
FIG. 5 is a schematic structural diagram of Embodiment 1 of an image processing apparatus according to the present application.

FIG. 5 is a schematic structural diagram of Embodiment 1 of an image processing apparatus according to the present application. As shown in FIG. 5, the image processing apparatus (hereinafter referred to as apparatus) 500 comprises:

an image acquisition module 51, configured to acquire two images of the same scene shot in the same position with the same aperture pattern and different depth of field parameters;

a frequency-domain conversion module 52, configured to perform frequency-domain conversion on each of the images, to obtain a frequency-domain signal of each image; and a first processing module 53, configured to obtain an all-in-focus image of the scene at least according to the frequency-domain signal of each image and the different depth of field parameters.

In this embodiment, the image processing apparatus 500 is optionally installed on a user terminal in a form of software and/or hardware. Optionally, the user terminal is a camera, or any user terminal comprising an image shooting component, for example, a smartphone with a shooting function.

In this embodiment, the aperture pattern may be any pattern, commonly a polygon, such as a hexagon.

In this embodiment, the depth of field parameters refer to parameters that affect the size and/or position of depth of field, and the depth of field parameters may include at least one of the following: aperture F values, focusing distances.

The aperture F value refers to aperture F value when the image shooting apparatus shoots the image. In the case that the aperture pattern is fixed, the aperture F value decides aperture size. Generally, for an image shooting apparatus, its aperture pattern is generally fixed, but its aperture size can be adjusted under some circumstances. Specifically, the aperture size may be represented by the reciprocal of the square of the aperture F value, that is, $1/F^2$, and common F values comprise: 1.0, 1.4, 2.0, 2.8, 4.0, 5.6, 8.0, 11 and so on.

The focusing distance refers to distance between focusing plane and lens optical center of the image shooting apparatus when the image shooting apparatus shoots the image. FIG. 2 is a schematic diagram of a focusing distance according to the present application. Specifically, the focusing distance is affected by a lens focal length and an image distance (that is, a distance between an imaging plane and a lens optical center). In a scene where the lens focal length is constant, generally, the focusing distance can be adjusted by adjusting the image distance; in a scene where the lens focal length is variable, the focusing distance can be adjusted by adjusting the image distance and/or the lens focal length.

In this embodiment, the different depth of field parameters may include any one of the following: aperture F values are the same but focusing distances are different, the focusing distances are the same but the aperture F values are different, and both the aperture F values and the focusing distances are different.

In this embodiment, aperture F value and focusing distance of each image may be obtained from header files of the image.

In this embodiment, each image can be represented with at least one space-domain signal of the image. The space-domain signal may include, but not limited to, any one of the following: a grey scale signal, a red (R) signal, a green (G) signal, and a blue (B) signal.

Optionally, the image acquisition module 51 is specifically configured to: acquire a space-domain signal of each image; and the frequency-domain conversion module 52 is specifically configured to: perform frequency-domain conversion on the space-domain signal of each image, to obtain a frequency-domain signal of each image.

For example, the two images include an image A and an image B, the image acquisition module 51 acquires an R signal of the image A and an R signal of the image B, and the frequency-domain conversion module 52 performs frequency-domain conversion respectively on the R signal of the image A and the R signal of the image B, to obtain a frequency-domain signal of the image A and a frequency-domain signal of the image B.

Specifically, as the images are generally two-dimensional, space-domain signals of the images are also two-dimensional, that is, independent variable spaces of the space-domain signals of the images are two-dimensional spaces.

In this embodiment, the frequency-domain conversion performed by the frequency-domain conversion module 52 may have many manners, for example, FT, WT and so on.

In this embodiment, the first processing module 53 is specifically configured to: obtain a space-domain signal of the all-in-focus image of the scene at least according to the frequency-domain signal of each image and the different depth of field parameters.

For example, the two images include an image A and an image B, the image acquisition module 51 acquires an R signal of the image A and an R signal of the image B, the frequency-domain conversion module 52 performs frequency-domain conversion respectively on the R signal of the image A and the R signal of the image B, to obtain a frequency-domain signal of the image A and a frequency-domain signal of the image B, and the first processing module 53 obtains an R signal of the all-in-focus image at least according to the frequency-domain signal of the image A, the frequency-domain signal of the image B and the different depth of field parameters.

For the same scene, when images of the scene are shot in the same position with the same aperture pattern and different depth of field parameters, a space-domain signal of each image shot is equivalent to a result of convolution of a corresponding space-domain signal of the all-in-focus image of the scene and a PSF (also called PSF of the image) of an optical system when the image shooting apparatus shoots the image, for example, an R signal of an image shot is equivalent to a result of convolution of an R signal of an all-in-focus image of the scene and a PSF of the image, while the PSF of the image is related to the aperture pattern of the image shooting apparatus and the depth of field parameters when the image is shot. Specifically, PSF patterns of images obtained by using image shooting apparatuses with the same aperture pattern to shoot the same scene in the same position are generally the same, and different depth of field parameters during shooting decide scaling of PSFs with the same pattern in the independent variable space. For example, if focusing distances of two images obtained by using image shooting apparatuses with the same aperture pattern to shoot the same scene in the same position are identical but a ratio of aperture sizes is 2, that is, a reciprocal of a ratio of squares of the aperture F values is 2, the PSF of the image with a greater aperture is equivalent to a result of enlarging the PSF of the image with a smaller aperture in the independent variable space by 4 times; if aperture sizes of the two images obtained by using image shooting apparatuses with the same aperture pattern to shoot the same scene in the same position are identical but an absolute value of a ratio of differences between focusing distances and depths of the scene is 2, the PSF of the image with a greater absolute value of the difference is equivalent to a result of enlarging the PSF of the image with a smaller absolute value of the difference in the independent variable space by 4 times. Further, as convolution of space domain is equivalent to multiplication of frequency domain, a frequency-domain signal of each image shot is equivalent to a product of a corresponding frequency-domain signal of the all-in-focus image of the scene and an OTF (also called: OTF of the image) of an optical system when the image shooting apparatus shoots the image, for example, a frequency-domain signal of an R signal of an image shot is equivalent to a product of a frequency-domain signal of an R signal of the all-in-focus image of the scene and an OTF of the image, wherein OTF is a frequency-domain representation of PSF. Specifically, patterns of OTFs of images obtained by using an image shooting apparatus with the same aperture pattern to shoot the same scene in the same position are generally the same, while different depth of field parameters during shooting decide scaling of the OTFs with the same pattern in a frequency space, and the scaling of the OTFs and the scaling of the PSFs are reversed. For example, if focusing distances of two images obtained by using image shooting apparatuses with the same aperture pattern to shoot the same scene in the same position are identical but a ratio of aperture sizes is 2, the OTF of the image with a smaller aperture is equivalent to a result of enlarging the OTF of the image with a greater aperture in a frequency space by 4 times; if aperture sizes of the two images obtained by using image shooting apparatuses with the same aperture pattern to shoot the same scene in the same position are the same but an absolute value of a ratio of differences between focusing distances and depths of the scene is 2, the OTF of the image with a smaller absolute value of the difference is equivalent to a result of enlarging the OTF of the image with a greater absolute value of the difference in an independent variable space by 4 times.

Specifically, a depth of the scene is a distance between the scene and a lens optical center of the image shooting apparatus, and optionally, the depth of the scene is an average value of a maximum distance and a minimum distance of the objects in the scene from the lens optical center of the image shooting apparatus. As the two images are shot for the same scene in the same position, it can be considered that depths of the scene in the two images are the same.

Accordingly, if the image acquisition module 51 acquires corresponding space-domain signals K1 and K2 of two images, the frequency-domain conversion module 52 performs frequency-domain conversion on K1 and K2, to obtain frequency-domain signals W1 and W2 of the two images, suppose that OTFs of the two images are F1 and F2 and a corresponding frequency-domain signal of the all-in-focus image of the scene is I, then W1=I*F1, W2=I*F2, and F1=a*F2 are met, wherein a is related to depth of field parameters of the two images, correspondingly, if W1, W2 and a are known, the first processing module 53 can obtain I, F1 and F2, and further, can obtain a space-domain signal of the all-in-focus image of the scene according to I.

The image processing apparatus of this embodiment, by acquiring, by an image acquisition module, two images of the same scene shot in the same position with the same aperture pattern and different depth of field parameters, performing, by a frequency-domain conversion module, frequency-domain conversion on each of the images, to obtain a frequency-domain signal of each image, and obtaining, by a first processing module, an all-in-focus image of the scene at least according to the frequency-domain signal of each image and the different depth of field parameters, provides an image processing solution, and can obtain the all-in-focus image of one scene based on two images of the scene with different depth of field parameters, which is more convenient.

The method of this embodiment is further described below with reference to some optional implementations.

In this embodiment, although aperture patterns of the two images are the same, aperture sizes may be different, while in a scene where the aperture sizes are different, aperture angles may also vary, thereby resulting in that patterns of PSFs and OTFs are different. The aperture angles are generally changed with rotation of apertures. FIG. 3 is a schematic diagram of several possible aperture forms according to one embodiment of the present application. As shown in FIG. 3, aperture patterns of a, b and c are the same and are all pentagons, aperture sizes of a and b are the same but aperture angles are different, aperture sizes of a and c are different but aperture angles are the same, while an aperture pattern of d is a hexagon, which is different from the aperture patterns of a, b and c.

In order to avoid that different aperture angles lead to different PSF patterns and OTF patterns of the images, optionally, independent variable spaces of space-domain signals of the images acquired by the image acquisition module 51 are polar coordinates spaces, or, independent variable spaces of space-domain signals of the images acquired by the image acquisition module 51 are other coordinates spaces, for example, rectangular coordinates spaces, and correspondingly, before the frequency-domain conversion module 52 performs frequency-domain conversion, the image acquisition module 51 or the frequency-domain conversion module 52 converts the independent variable spaces of the space-domain signals of the images to polar coordinates spaces. Further, an independent variable space of a space-domain signal of the all-in-focus image directly obtained by the first processing module 53 at least according to the frequency-domain signal of each image and the different depth of field parameters is a polar coordinates space, and optionally, the first processing module 53 may further convert the independent variable space of the space-domain signal of the all-in-focus image to another coordinates space, for example, a rectangular coordinates space.

In this embodiment, the frequency-domain conversion module 52 has many manners of implementation.

For objects with similar depths, PSFs of the same optical system vary slightly, and in one optional implementation, the frequency-domain conversion module 52 is specifically configured to:

in response to that a maximum depth difference of the scene does not exceed a first depth difference threshold, perform frequency-domain conversion on each of the images, to obtain a frequency-domain signal of each image.

Reference can be made to the corresponding description in the embodiments of the image processing method provided in the present application for specific implementation of this embodiment.

Figure 6A:
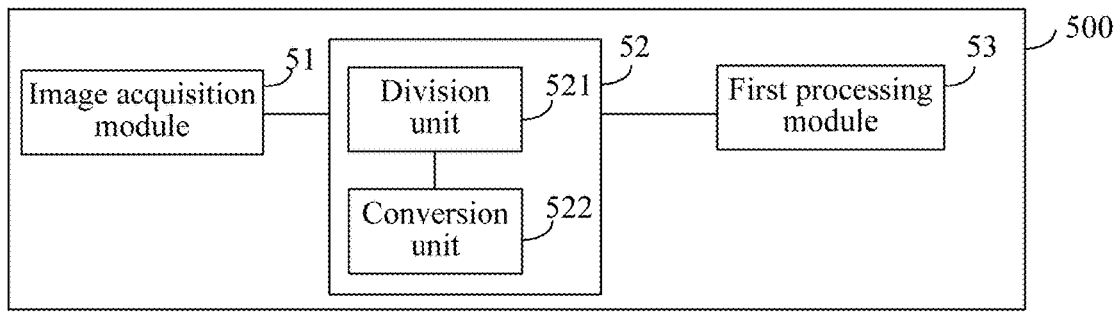
FIG. 6A-FIG. 6E are respectively schematic structural diagrams of one implementation of the embodiment shown in FIG. 5.

For objects whose depths vary greatly, PSFs of the same optical system vary greatly, and in order to obtain a more vivid all-in-focus image, in another optional implementation, as shown in FIG. 6A, the frequency-domain conversion module 52 comprises:

a division unit 521, configured to, in response to that a maximum depth difference of the scene exceeds a second depth difference threshold, divide each image into at least two regions in the same way, a maximum depth difference of each region not exceeding the second depth difference threshold; and a conversion unit 522, configured to perform frequency-domain conversion on at least one pair of space-domain signals of at least one corresponding pair of regions in each image, to obtain at least one pair of frequency-domain signals of the at least one pair of regions.

Reference can be made to the corresponding description in the embodiments of the image processing method provided in the present application for specific implementation of this embodiment.

In this embodiment, the first processing module 53 has many manners of implementation.

Figure 6B:
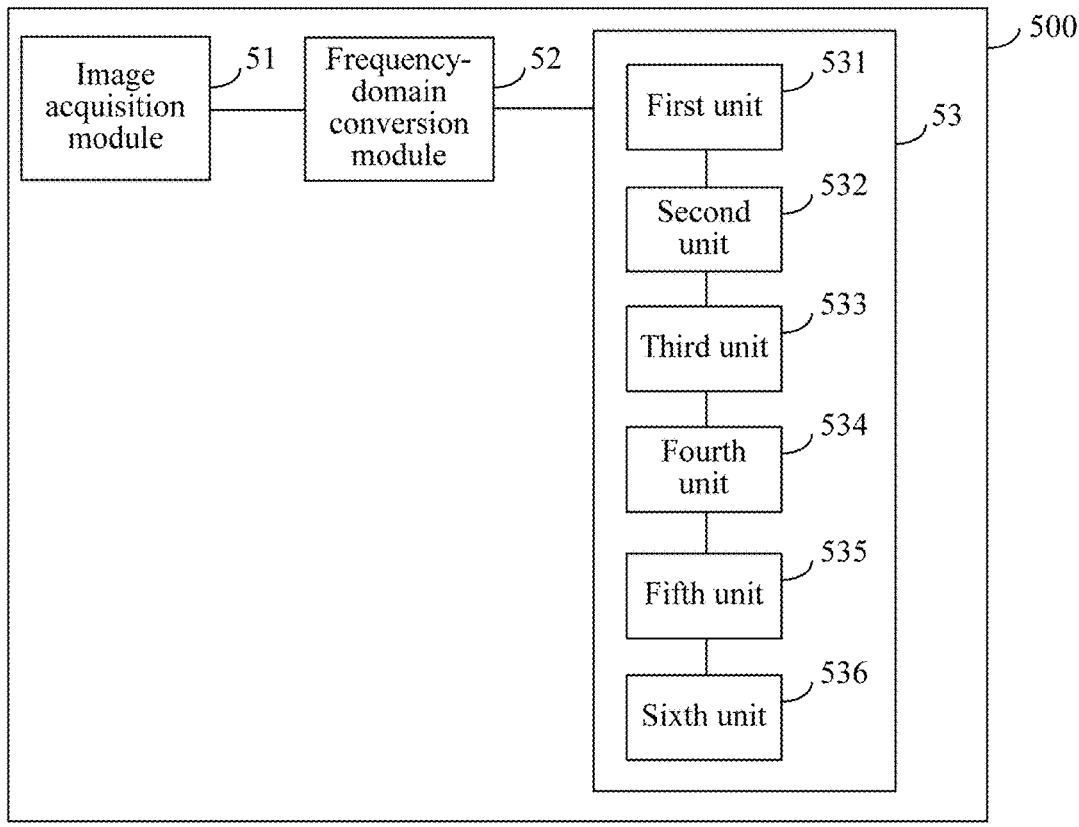

In one optional implementation, the two images include: a first image and a second image;

a product of a ratio of the square of an aperture F value of the second image to the square of an aperture F value of the first image and an absolute value of a ratio of a difference between a depth of the scene in the first image and a focusing distance of the first image to a difference between a depth of the scene in the second image and a focusing distance of the second image is a first value greater than 1; and as shown in FIG. 6B, the first processing module 53 comprises:

a first unit 531, configured to take a part of a first spectrum region, which has the lowest frequency and an area of a second value, in a first frequency-domain signal of the first image as a part of the first spectrum region in a first optical transfer function OTF of the first image;

a second unit 532, configured to amplify the part of the first spectrum region in the first OTF in a frequency space by a factor of the first value, to obtain a part of a second spectrum region in a second OTF of the second image, an area of the second spectrum region being equal to a product of an area of the first spectrum region and the square of the first value;

a third unit 533, configured to perform local inversion on a second frequency-domain signal of the second image based on the part of the second spectrum region in the second OTF, to obtain a part of the second spectrum region in a third frequency-domain signal of the all-in-focus image;

a fourth unit 534, configured to perform local inversion on the first frequency-domain signal based on the part of the second spectrum region in the third frequency-domain signal, to obtain a part of the second spectrum region in the first OTF;

a fifth unit 535, configured to successively iterate the enlargement and the local inversion based on the part of the second spectrum region in the first OTF, to obtain the third frequency-domain signal; and a sixth unit 536, configured to perform space-domain conversion on the third frequency-domain signal, to obtain a space-domain signal of the all-in-focus image.

Figure 6C:
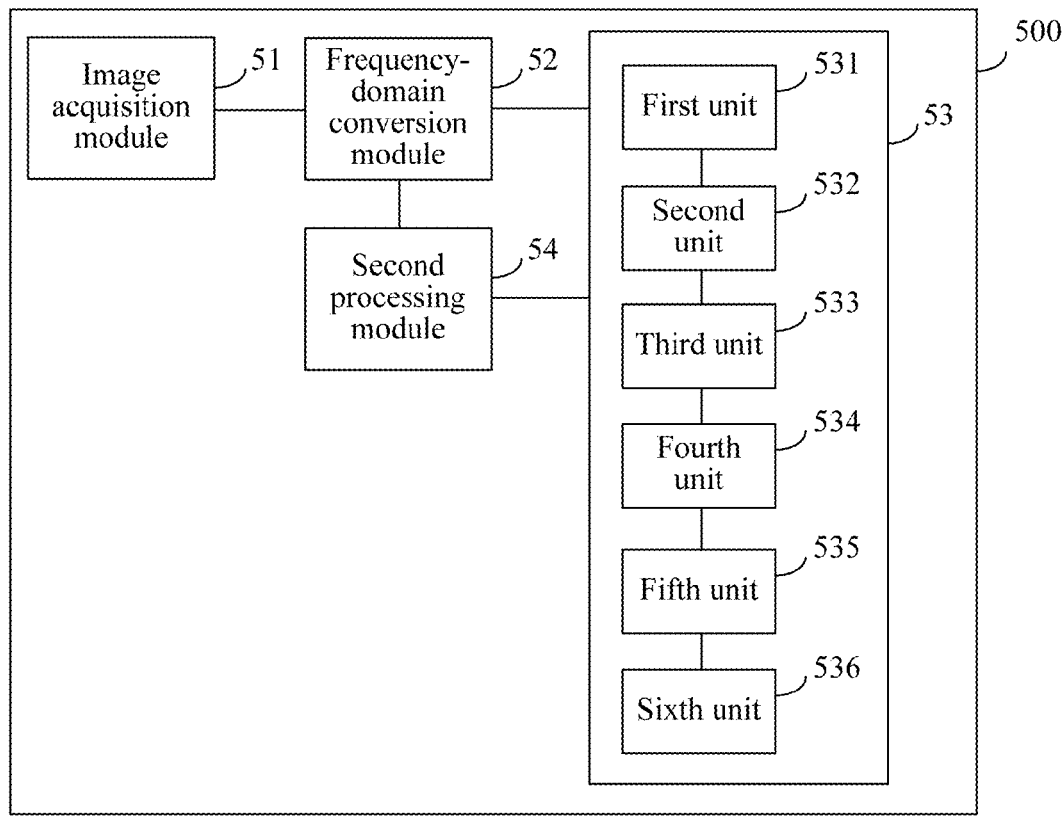

In this implementation, in order to further obtain at least one other space-domain signal of the all-in-focus image, for example, after the R signal of the all-in-focus image is obtained, a G signal and a B signal of the all-in-focus image are obtained, and optionally, the fifth unit 535 is specifically configured to: successively iterate the enlargement and the local inversion in the second unit, the third unit and the fourth unit based on the part of the second spectrum region in the first OTF, to obtain the third frequency-domain signal and the first OTF;

the image acquisition module 51 is further configured to: acquire at least one other space-domain signal of the first image;

the frequency-domain conversion module 52 is further configured to: perform frequency-domain conversion on the at least one other space-domain signal of the first image, to obtain at least one other frequency-domain signal of the first image; and as shown in FIG. 6C, the apparatus 500 further comprises:

a second processing module 54, configured to perform inversion on the at least one other frequency-domain signal of the first image, to obtain at least one fourth frequency-domain signal of the all-in-focus image; and perform space-domain conversion on the at least one fourth frequency-domain signal of the all-in-focus image, to obtain at least one other space-domain signal of the all-in-focus image.

Reference can be made to the corresponding description in the embodiments of the image processing method provided in the present application for specific implementation of this embodiment.

Figure 6D:
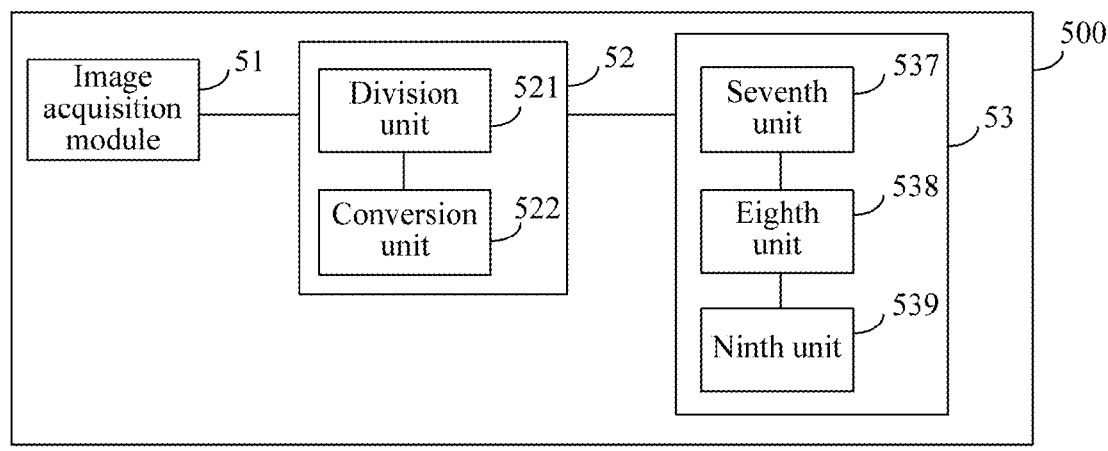

In another optional implementation, for example, in the implementation as shown in FIG. 6A, the two images include: a third image and a fourth image, and the at least one corresponding pair of regions in each image comprise:
a first region in the third image and a second region in the fourth image corresponding to the first region;
a product of a ratio of the square of an aperture F of the fourth image to the square of an aperture F value of the third image and an absolute value of a ratio of a difference between a depth of the scene in the third image and a focusing distance of the third image to a difference between a depth of the scene in the fourth image and a focusing distance of the fourth image is a third value greater than 1; and as shown in FIG. 6D, the first processing module 53 comprises:

a seventh unit 537, configured to obtain a space-domain signal of a first sub-image of a third region in the scene corresponding to the first region and a third OTF of the first region at least according to a fifth frequency-domain signal of the first region, a sixth frequency-domain signal of the second region and the third value;

an eighth unit 538, configured to obtain at least one space-domain signal of at least one second sub-image of at least one fifth region in the scene corresponding to at least one fourth region at least corresponding to a focusing distance of the first image, a depth of the first region, the third OTF, at least one depth and at least one space-domain signal of the at least one fourth region in the first image other than the first region; and a ninth unit 539, configured to obtain a space-domain signal of the all-in-focus image according to the space-domain signal of the first sub-image of the third region and the at least one space-domain signal of the at least one second sub-image of the at least one fifth region.

Figure 6E:
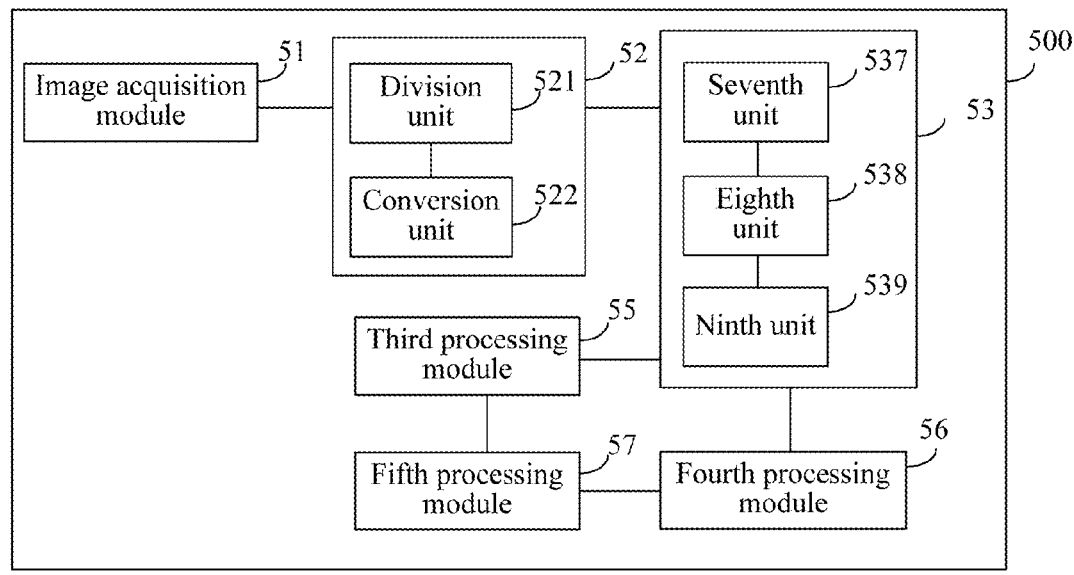

In this implementation, in order to further obtain at least one other space-domain signal of the all-in-focus image, for example, a G signal and a B signal of the all-in-focus image are obtained after an R signal of the all-in-focus image is obtained, optionally, as shown in FIG. 6E, the apparatus 500 further comprises:

a third processing module 55, configured to acquire at least one other space-domain signal of the first region; perform frequency-domain conversion on the at least one other space-domain signal of the first region, to obtain at least one other frequency-domain signal of the first region; and obtain at least one other space-domain signal of the first sub-image according to the third OTF and the at least one other frequency-domain signal of the first region;

a fourth processing module 56, configured to acquire at least one other space-domain signal of each fourth region; perform frequency-domain conversion on the at least one other space-domain signal of each fourth region, to obtain at least one other frequency-domain signal of each fourth region; and obtain at least one other space-domain signal of the second sub-image according to the third OTF and the at least one other frequency-domain signal of each fourth region; and a fifth processing module 57, configured to obtain at least one other space-domain signal of the all-in-focus image according to the at least one other space-domain signal of the first sub-image and the at least one other space-domain signal of the second sub-image.

Reference can be made to the corresponding description in the embodiments of the image processing method provided in the present application for specific implementation of this embodiment.

In this embodiment, the image acquisition module 51 has many manners of implementation.

In one optional implementation, the image acquisition module 51 is specifically configured to: acquire, from an image shooting apparatus, two images of the same scene shot by the image shooting apparatus in the same position with different depth of field parameters.

Optionally, the image shooting apparatus may be designed to automatically shoot two images of the same scene with different depth of field parameters after a user presses the "shoot" button.

In another optional implementation, the image acquisition module 51 is specifically configured to: acquire, respectively from two image shooting apparatuses with the same aperture pattern, two images of the same scene shot by the two image shooting apparatuses in the same position with different depth of field parameters.

Figure 7:
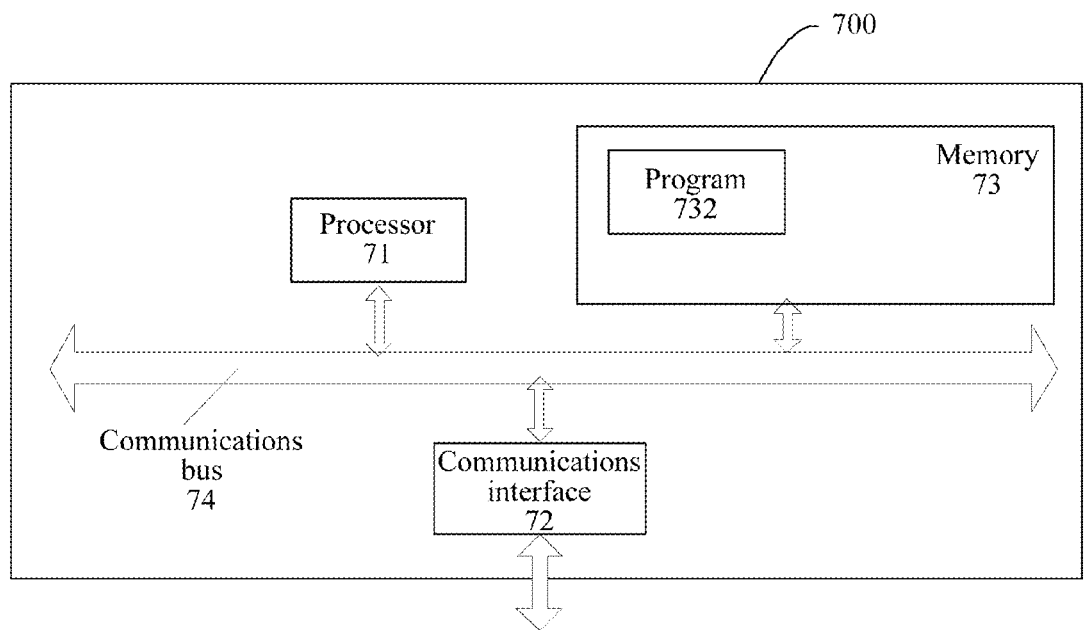
FIG. 7 is a schematic structural diagram of Embodiment 2 of an image processing apparatus according to the present application.

FIG. 7 is a schematic structural diagram of Embodiment 2 of an image processing apparatus according to the present application. As shown in FIG. 7, the image processing apparatus 700 comprises:

a processor 71, a Communications Interface 72, a memory 73, and a communications bus 74.

The processor 71, the Communications Interface 72, and the memory 73 accomplish mutual communications via the communications bus 74.

The Communications Interface 72 is configured to communicate with, for example, an image shooting apparatus and so on.

The processor 71 is configured to execute a program 732, and specifically, can implement relevant steps in the embodiments of the image processing method.

For example, the program 732 may comprise a program code, the program code comprising a computer operation instruction.

The processor 71 may be a central processing unit (CPU), or an application specific integrated circuit (ASIC), or be configured to be one or more integrated circuits which implement the embodiments of the image processing method.

The memory 73 is configured to store the program 732. The memory 73 may comprise a high-speed RAM memory, and may also comprise a non-volatile memory, for example, at least one magnetic disk memory. The program 732 may be specifically configured to enable the image processing apparatus 700 to execute the following steps:

acquiring two images of the same scene shot in the same position with the same aperture pattern and different depth of field parameters;

performing frequency-domain conversion on each of the images, to obtain a frequency-domain signal of each image; and obtaining an all-in-focus image of the scene at least according to the frequency-domain signal of each image and the different depth of field parameters.

Reference can be made to corresponding description in the corresponding steps and units in the embodiments of the image processing method for specific implementation of the steps in the program 732, which is not repeated herein.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can store program codes.

The above implementations are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. An image processing method, wherein the method comprises:

acquiring two images of the same scene shot in the same position with the same aperture pattern and different depth of field parameters;

performing frequency-domain conversion on each of the images, to obtain a frequency-domain signal of each image; and obtaining an all-in-focus image of the scene at least according to the frequency-domain signal of each image and the different depth of field parameters;

wherein the acquiring two images of the same scene shot in the same position with the same aperture pattern and different depth of field parameters comprises: acquiring a space-domain signal of each image; and wherein the performing frequency-domain conversion on each of the images, to obtain a frequency-domain signal of each image comprises: obtaining a maximum depth difference of the scene; and in response to that the maximum depth difference of the scene does not exceed a depth difference threshold, performing frequency-domain conversion on the space-domain signal of each image, to obtain a frequency-domain signal of each image.

2. The method of claim 1, wherein the space-domain signal comprises at least one of the following: a grey scale signal, a red (R) signal, a green (G) signal, and a blue (B) signal.

3. The method of claim 1, wherein the depth of field parameters comprise at least one of the following: aperture F values, focusing distances.

4. The method of claim 1, wherein the two images comprise: a first image and a second image;

a product of a ratio of the square of an aperture F value of the second image to the square of an aperture F value of the first image and an absolute value of a ratio of a difference between a depth of the scene in the first image and a focusing distance of the first image to a difference between a depth of the scene in the second image and a focusing distance of the second image is a first value greater than 1; and the obtaining an all-in-focus image of the scene at least according to the frequency-domain signal of each image and the different depth of field parameters comprises:

taking a part of a first spectrum region, which has the lowest frequency and an area of a second value, in a first frequency-domain signal of the first image as a part of the first spectrum region in a first optical transfer function OTF of the first image;

enlarging the part of the first spectrum region in the first OTF in a frequency space by a factor of a square of the first value, to obtain a part of a second spectrum region in a second OTF of the second image, an area of the second spectrum region being equal to a product of an area of the first spectrum region and the square of the first value;

performing local inversion on a second frequency-domain signal of the second image based on the part of the second spectrum region in the second OTF, to obtain a part of the second spectrum region in a third frequency-domain signal of the all-in-focus image;

performing local inversion on the first frequency-domain signal based on the part of the second spectrum region in the third frequency-domain signal, to obtain a part of the second spectrum region in the first OTF;

successively iterating the enlargement and the local inversion based on the part of the second spectrum region in the first OTF, to obtain the third frequency-domain signal; and performing space-domain conversion on the third frequency-domain signal, to obtain a space-domain signal of the all-in-focus image.

5. The method of claim 4, wherein the successively iterating the enlargement and the local inversion based on the part of the second spectrum region in the first OTF, to obtain the third frequency-domain signal comprises:

successively iterating the enlargement and the local inversion based on the part of the second spectrum region in the first OTF, to obtain the third frequency-domain signal and the first OTF;

the method further comprises: acquiring at least one other space-domain signal of the first image; performing frequency-domain conversion on the at least one other space-domain signal of the first image, to obtain at least one other frequency-domain signal of the first image; performing inversion on the at least one other frequency-domain signal of the first image, to obtain at least one fourth frequency-domain signal of the all-in-focus image; and performing space-domain conversion on the at least one fourth frequency-domain signal of the all-in-focus image, to obtain at least one other space-domain signal of the all-in-focus image.

6. The method of claim 1, wherein an independent variable space of the space-domain signal is a polar coordinates space.

7. The method of claim 1, wherein the acquiring two images of the same scene shot in the same position with the same aperture pattern and different depth of field parameters comprises:

acquiring, from an image shooting apparatus, two images of the same scene shot by the image shooting apparatus in the same position with different depth of field parameters.

8. The method of claim 1, wherein the acquiring two images of the same scene shot in the same position with the same aperture pattern and different depth of field parameters comprises:

acquiring, respectively from two image shooting apparatuses with the same aperture pattern, two images of the same scene shot by the two image shooting apparatuses in the same position with different depth of field parameters.

9. An image processing method, wherein the method comprises:

acquiring two images of the same scene shot in the same position with the same aperture pattern and different depth of field parameters;

performing frequency-domain conversion on each of the images, to obtain a frequency-domain signal of each image; and obtaining an all-in-focus image of the scene at least according to the frequency-domain signal of each image and the different depth of field parameters;

wherein the acquiring two images of the same scene shot in the same position with the same aperture pattern and different depth of field parameters comprises: acquiring a space-domain signal of each image; and wherein the performing frequency-domain conversion on each of the images, to obtain a frequency-domain signal of each image comprises: in response to that a maximum depth difference of the scene exceeds a depth difference threshold, dividing each image into at least two regions in the same way, a maximum depth difference of each region not exceeding the depth difference threshold; and performing frequency-domain conversion on at least one pair of space-domain signals of at least one corresponding pair of regions in each image, to obtain at least one pair of frequency-domain signals of the at least one pair of regions.

10. The method of claim 9, wherein the two images comprise: a third image and a fourth image, and the at least one corresponding pair of regions in each image comprise: a first region in the third image and a second region in the fourth image corresponding to the first region;

a product of a ratio of the square of an aperture F of the fourth image to the square of an aperture F value of the third image and an absolute value of a ratio of a difference between a depth of the scene in the third image and a focusing distance of the third image to a difference between a depth of the scene in the fourth image and a focusing distance of the fourth image is a third value greater than 1; and the obtaining an all-in-focus image of the scene at least according to the frequency-domain signal of each image and the different depth of field parameters comprises:

obtaining a space-domain signal of a first sub-image of a third region in the scene corresponding to the first region and a third OTF of the first region at least according to a fifth frequency-domain signal of the first region, a sixth frequency-domain signal of the second region and the third value;

obtaining at least one space-domain signal of at least one second sub-image of at least one fifth region in the scene corresponding to at least one fourth region at least corresponding to a focusing distance of the first image, a depth of the first region, the third OTF, at least one depth and at least one space-domain signal of the at least one fourth region in the first image other than the first region; and obtaining a space-domain signal of the all-in-focus image according to the space-domain signal of the first sub-image of the third region and the at least one space-domain signal of the at least one second sub-image of the at least one fifth region.

11. The method of claim 10, wherein the method further comprises:

acquiring at least one other space-domain signal of the first region; performing frequency-domain conversion on the at least one other space-domain signal of the first region, to obtain at least one other frequency-domain signal of the first region; and obtaining at least one other space-domain signal of the first sub-image according to the third OTF and the at least one other frequency-domain signal of the first region;

acquiring at least one other space-domain signal of each fourth region; performing frequency-domain conversion on the at least one other space-domain signal of each fourth region, to obtain at least one other frequency-domain signal of each fourth region; and obtaining at least one other space-domain signal of the second sub-image according to the third OTF and the at least one other frequency-domain signal of each fourth region; and obtaining at least one other space-domain signal of the all-in-focus image according to the at least one other space-domain signal of the first sub-image and the at least one other space-domain signal of the second sub-image.

12. The method of claim 9, wherein an independent variable space of the space-domain signal is a polar coordinates space.

13. The method of claim 9, wherein the acquiring two images of the same scene shot in the same position with the same aperture pattern and different depth of field parameters comprises:
acquiring, from an image shooting apparatus, two images of the same scene shot by the image shooting apparatus in the same position with different depth of field parameters.

14. An image processing apparatus, wherein the apparatus comprises:
an image acquisition module, configured to acquire two images of the same scene shot in the same position with the same aperture pattern and different depth of field parameters;
a frequency-domain conversion module, configured to perform frequency-domain conversion on each of the images, to obtain a frequency-domain signal of each image; and
a first processing module, configured to obtain an all-in-focus image of the scene at least according to the frequency-domain signal of each image and the different depth of field parameters;
wherein the image acquisition module is configured to: acquire a space-domain signal of each image; and
wherein the frequency-domain conversion module is configured to:
obtain a maximum depth difference of the scene; and in response to that the maximum depth difference of the scene does not exceed a depth difference threshold, perform frequency-domain conversion on each of the images, to obtain a frequency-domain signal of each image.

15. The apparatus of claim 14, wherein the space-domain signal comprises at least one of the following: a grey scale signal, a red (R) signal, a green (G) signal, and a blue (B) signal.

16. The apparatus of claim 14, wherein the depth of field parameters comprise at least one of the following: aperture F values, focusing distances.

17. The apparatus of claim 14, wherein the two images comprise: a first image and a second image;
a product of a ratio of the square of an aperture F value of the second image to the square of an aperture F value of the first image and an absolute value of a ratio of a difference between a depth of the scene in the first image and a focusing distance of the first image to a difference between a depth of the scene in the second image and a focusing distance of the second image is a first value greater than 1; and
the first processing module comprises:
a first unit, configured to take a part of a first spectrum region, which has the lowest frequency and an area of a second value, in a first frequency-domain signal of the first image as a part of the first spectrum region in a first optical transfer function OTF of the first image;
a second unit, configured to amplify the part of the first spectrum region in the first OTF in a frequency space by a factor of a square of the first value, to obtain a part of a second spectrum region in a second OTF of the second image, an area of the second spectrum region being equal to a product of an area of the first spectrum region and the square of the first value;
a third unit, configured to perform local inversion on a second frequency-domain signal of the second image based on the part of the second spectrum region in the second OTF, to obtain a part of the second spectrum region in a third frequency-domain signal of the all-in-focus image;
a fourth unit, configured to perform local inversion on the first frequency-domain signal based on the part of the second spectrum region in the third frequency-domain signal, to obtain a part of the second spectrum region in the first OTF;
a fifth unit, configured to successively iterate the enlargement and the local inversion based on the part of the second spectrum region in the first OTF, to obtain the third frequency-domain signal; and
a sixth unit, configured to perform space-domain conversion on the third frequency-domain signal, to obtain a space-domain signal of the all-in-focus image.

18. The apparatus of claim 17, wherein the fifth unit is configured to: successively iterate the enlargement and the local inversion based on the part of the second spectrum region in the first OTF, to obtain the third frequency-domain signal and the first OTF;
the image acquisition module is further configured to: acquire at least one other space-domain signal of the first image;
the frequency-domain conversion module is further configured to: perform frequency-domain conversion on the at least one other space-domain signal of the first image, to obtain at least one other frequency-domain signal of the first image; and
the apparatus further comprises: a second processing module, configured to perform inversion on the at least one other frequency-domain signal of the first image, to obtain at least one fourth frequency-domain signal of the all-in-focus image; and perform space-domain conversion on the at least one fourth frequency-domain signal of the all-in-focus image, to obtain at least one other space-domain signal of the all-in-focus image.

19. The apparatus of claim 14, wherein an independent variable space of the space-domain signal is a polar coordinates space.

20. The apparatus of claim 14, wherein the image acquisition module is configured to: acquire, from an image shooting apparatus, two images of the same scene shot by the image shooting apparatus in the same position with different depth of field parameters.

21. The apparatus of claim 14, wherein the image acquisition module is configured to: acquire, respectively from two image shooting apparatuses with the same aperture pattern, two images of the same scene shot by the two image shooting apparatuses in the same position with different depth of field parameters.

22. An image processing apparatus, wherein the apparatus comprises:
an image acquisition module, configured to acquire two images of the same scene shot in the same position with the same aperture pattern and different depth of field parameters;
a frequency-domain conversion module, configured to perform frequency-domain conversion on each of the images, to obtain a frequency-domain signal of each image; and
a first processing module, configured to obtain an all-in-focus image of the scene at least according to the frequency-domain signal of each image and the different depth of field parameters;
wherein the image acquisition module is configured to: acquire a space-domain signal of each image; and
wherein the frequency-domain conversion module comprises:
a division unit, configured to, in response to that a maximum depth difference of the scene exceeds a depth difference threshold, divide each image into at least two regions in the same way, a maximum depth difference of each region not exceeding the depth difference threshold; and
a conversion unit, configured to perform frequency-domain conversion on at least one pair of space-domain signals of at least one corresponding pair of regions in each image, to obtain at least one pair of frequency-domain signals of the at least one pair of regions.

23. The apparatus of claim 22, wherein the two images comprise: a third image and a fourth image, and the at least one corresponding pair of regions in each image comprise: a first region in the third image and a second region in the fourth image corresponding to the first region;
a product of a ratio of the square of an aperture F of the fourth image to the square of an aperture F value of the third image and an absolute value of a ratio of a difference between a depth of the scene in the third image and a focusing distance of the third image to a difference between a depth of the scene in the fourth image and a focusing distance of the fourth image is a third value greater than 1; and
the first processing module comprises:
a seventh unit, configured to obtain a space-domain signal of a first sub-image of a third region in the scene corresponding to the first region and a third OTF of the first region at least according to a fifth frequency-domain signal of the first region, a sixth frequency-domain signal of the second region and the third value;
an eighth unit, configured to obtain at least one space-domain signal of at least one second sub-image of at least one fifth region in the scene corresponding to at least one fourth region at least corresponding to a focusing distance of the first image, a depth of the first region, the third OTF, at least one depth and at least one space-domain signal of the at least one fourth region in the first image other than the first region; and
a ninth unit, configured to obtain a space-domain signal of the all-in-focus image according to the space-domain signal of the first sub-image of the third region and the at least one space-domain signal of the at least one second sub-image of the at least one fifth region.

24. The apparatus of claim 23, wherein the apparatus further comprises:
a third processing module, configured to acquire at least one other space-domain signal of the first region; perform frequency-domain conversion on the at least one other space-domain signal of the first region, to obtain at least one other frequency-domain signal of the first region; and obtain at least one other space-domain signal of the first sub-image according to the third OTF and the at least one other frequency-domain signal of the first region;
a fourth processing module, configured to acquire at least one other space-domain signal of each fourth region; perform frequency-domain conversion on the at least one other space-domain signal of each fourth region, to obtain at least one other frequency-domain signal of each fourth region; and obtain at least one other space-domain signal of the second sub-image according to the third OTF and the at least one other frequency-domain signal of each fourth region; and
a fifth processing module, configured to obtain at least one other space-domain signal of the all-in-focus image according to the at least one other space-domain signal of the first sub-image and the at least one other space-domain signal of the second sub-image.

25. The apparatus of claim 22, wherein an independent variable space of the space-domain signal is a polar coordinates space.

26. The apparatus of claim 22, wherein the image acquisition module is configured to: acquire, from an image shooting apparatus, two images of the same scene shot by the image shooting apparatus in the same position with different depth of field parameters.

27. A non-transitory computer-readable medium comprising executable instructions that, when executed by a processor of a device, cause the device with the processor to perform operations, comprising:
acquiring two images of the same scene shot in the same position with the same aperture pattern and different depth of field parameters;
performing frequency-domain conversion on each of the images, to obtain a frequency-domain signal of each image; and
obtaining an all-in-focus image of the scene at least according to the frequency-domain signal of each image and the different depth of field parameters;
wherein the acquiring two images of the same scene shot in the same position with the same aperture pattern and different depth of field parameters comprises: acquiring a space-domain signal of each image; and
wherein the performing frequency-domain conversion on each of the images, to obtain a frequency-domain signal of each image comprises: obtaining a maximum depth difference of the scene, and in response to that the maximum depth difference of the scene does not exceed a depth difference threshold, performing frequency-domain conversion on each of the images, to obtain a frequency-domain signal of each image.

* * * * *